United States Patent [19]

Cosman

[11] Patent Number: 5,651,104
[45] Date of Patent: Jul. 22, 1997

[54] COMPUTER GRAPHICS SYSTEM AND PROCESS FOR ADAPTIVE SUPERSAMPLING

[75] Inventor: Michael A. Cosman, South Jordan, Utah

[73] Assignee: Evans & Sutherland Computer Corporation, Salt Lake City, Utah

[21] Appl. No.: 428,028

[22] Filed: Apr. 25, 1995

[51] Int. Cl.$^6$ ............................................. G06F 15/00
[52] U.S. Cl. ........................................................ 395/128
[58] Field of Search .............................. 395/128, 140, 395/125; 345/127, 132

[56] References Cited

U.S. PATENT DOCUMENTS

| | | | |
|---|---|---|---|
| 4,766,555 | 8/1988 | Bennett | 364/518 |
| 5,025,400 | 6/1991 | Cook et al. | 364/522 |
| 5,379,371 | 1/1995 | Usami et al. | 395/128 |
| 5,499,194 | 3/1996 | Prestidge et al. | 364/506 |

Primary Examiner—Phu Nguyen
Attorney, Agent, or Firm—Darby & Darby, P.C.

[57] ABSTRACT

A computer graphics system is defined using supersampling of multi-level pixel characteristic data. The system provides a detailed anti-aliased display of the texture on surfaces defined at oblique angles within the model space while providing simple real time controls to control the amount of extra processing required for the supersampling. A sampling path is defined within a projected pixel footprint on a textured surface defined in model space. These sample points are mapped to levels of detail and locations within a texture MIP map. The level of detail and supersampling locations are calculated for each pixel that the polygon influences. The sampled texture data is blended forming a single texture value for that pixel. This texture value is blended with other characteristics of the pixel to form the pixel data that is displayed on a display unit.

27 Claims, 4 Drawing Sheets

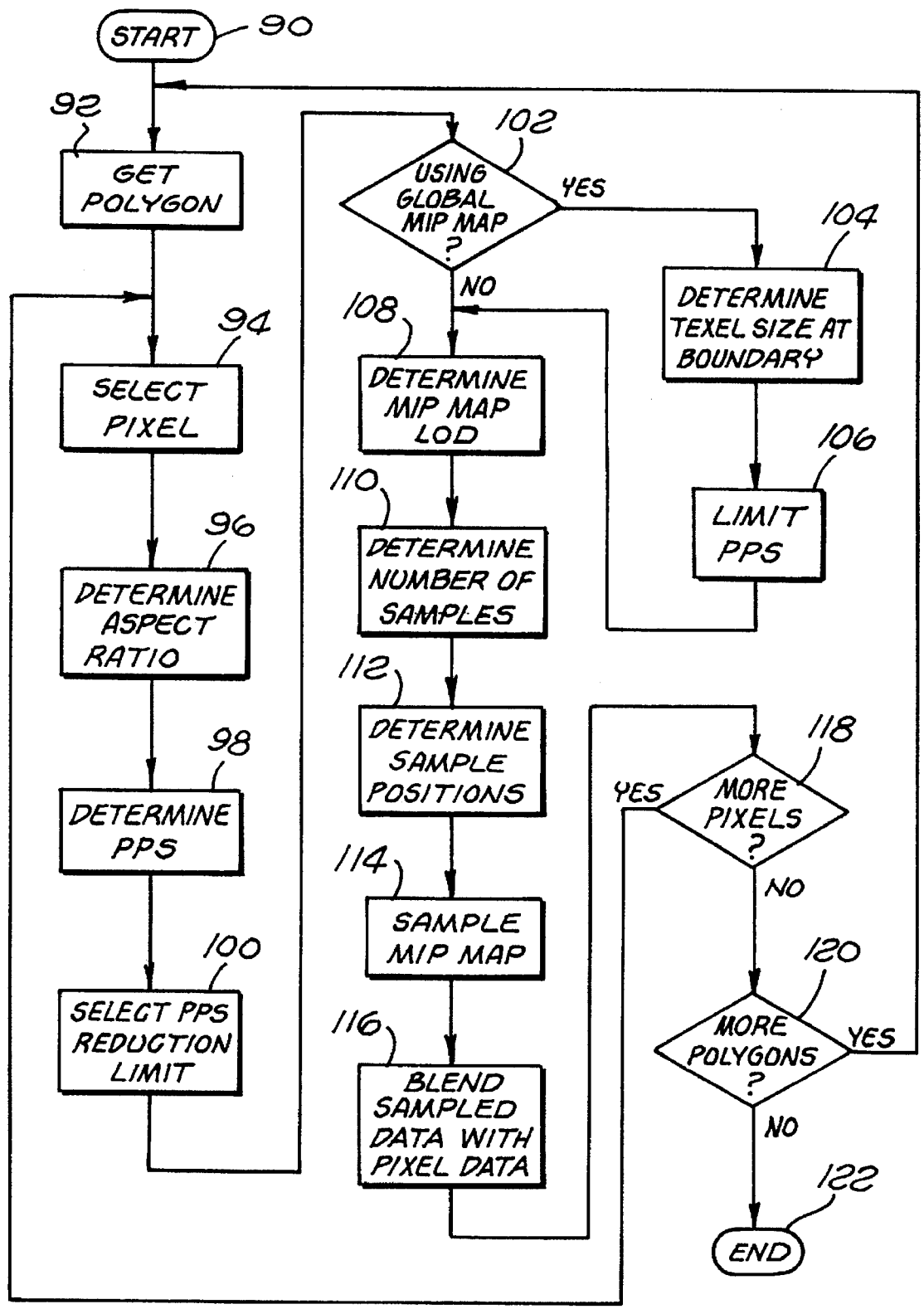
F I G. 6

COMPUTER GRAPHICS SYSTEM AND PROCESS FOR ADAPTIVE SUPERSAMPLING

FIELD OF THE INVENTION

The present invention relates to three-dimensional computer graphics systems and more specifically to the supersampling of two-dimensional data that is organized in multiple levels of detail and mapped to three-dimensional objects in a model space.

BACKGROUND AND SUMMARY OF THE INVENTION

Generally, computer graphics systems represent dynamic images by displaying data on the screen of a cathode ray tube (CRT). Typically, the CRT screen displays a rectangular array of thousands of individual picture elements (pixels). To activate displays, the visual characteristic such as the color, intensity and depth of each pixel is defined by associated pixel data.

In traditional three-dimensional graphics systems, three-dimensional images (containing a variety of objects or primitives) are generated for representation on the two-dimensional CRT screen. The operation involves defining a three-dimensional model space (e.g., a frustum of vision from a predefined viewpoint) and assigning sections of the model space (called component pixel frustums) to the pixels of the CRT screen. During a process known as polygon rendering, the pixel data is calculated according to the characteristics of objects or primitives, e.g., three-dimensional polygons, that lie in that pixel's frustum. The degree to which a given polygon is displayed by a given pixel depends on the intersection of the pixel's frustum with the polygon. The intersection defines an area, called a projected pixel footprint, on the polygon. Accordingly, each pixel displays the combined visual effects such as color, shade and transparency defined within the projected pixel footprint on all the polygons in that pixel's frustum.

The visual characteristics of a polygon may be enhanced by texturing the polygon. Texture is analogous to a digital wallpaper that is applied to surfaces, e.g., polygons. Texture can represent changes in any spatially varying surface parameter and is typically used to represent changes in intensity, color, opacity, or thematic content (such as surface material type). The process of applying texture patterns to surfaces is generally referred to as "texture mapping" and is a well known and widely used technique in computer graphics. For example, see U.S. Pat. No. 4,855,943 (System For Texturing Computer Graphics Images, Robinson) and the textbook *Computer Graphics: Principles and Practice.*, 2nd Edition, Foley, van Dam, Feiner & Hughes, (Reprinted in 1991)(1990), by Addison-Wesley Publishing Company, at section 16.3.2.

Texture is an implicitly regular two-dimensional array of data. Data elements in the array are called texels and the array is called a texture map. The texture coordinate space is implied by the nature of the array, i.e., its two coordinate axes are defined by the rows and columns of the array typically designated in "u" and "v" coordinates. Thus, the arrangement and scaling of the array has spatial and visual meaning.

A texture map is applied (mapped) to surfaces by designating the relationship of the texture coordinate space to the polygon coordinate space. Then, during the polygon rendering process, the texture data is combined with the other attributes of the polygon to determine the final pixel data values.

In the three-dimensional model space, texels undergo the same perspective distortions as the polygon. Consequently, when a polygon is rendered, range, angle or perspective may, for example, cause the squares of a texture checkerboard to become smaller than the projected pixel footprint. If either dimension of the texel becomes smaller than the pixel footprint and some texels are occasionally skipped over in the rendering process, the intermittent inclusion of texels can cause aliasing of the texture in the displayed pixels. This can happen even if the perspective texels are larger than the pixel footprint in one dimension. That is, the aliasing occurs based on the smaller dimension of the perspective texel.

Aliasing is a well known term applied to a wide variety of image quality problems. The term refers to high frequency image content masquerading as low frequency content. The visual effects of aliasing include image crawling, edge stair casing, scintillation, moiré patterns and general image noise.

Texture mapping has some characteristics that exacerbate the anti-aliasing issue. As seen by a viewer, most texture has been perspectively compressed in one dimension more than in the other dimension. This is because many polygon surfaces are defined at an oblique angle to the viewer. As polygon surfaces tilt to become more and more oblique to the viewer, the footprint of the pixel frustum on the polygon becomes progressively stretched and distorted into a long quadrilateral with a high aspect ratio. When this happens, more texels will be within the footprint along the length of the footprint than across the width of the footprint. If the texels along the length of the footprint are not adequately sampled, aliasing may occur.

One method of preventing texture aliasing on oblique polygons involves retrieving the texel values of all the texels within the pixel footprint and filtering or averaging all the texel values. However, since the size of the frustum grows as the distance from the viewer increases, this approach becomes computationally intractable because huge numbers of texels can be within the footprint.

To reduce the amount of processing required, some methods use a technique known as MIP mapping. MIP mapping and the use of MIP maps for texture mapping is treated in a paper entitled "Pyramidal Parametrics" by Lance Williams, published July 1983 in *Computer Graphics*, volume 17, no. 3. The article has been identified by the Association For Computing Machinery as ACM 0-89791-109-1/83/007/0001.

The MIP mapping technique uses a texture map that has a succession of different levels of detail. Each successive level of detail covers the same portion of the polygon with half as many texels in each direction. Thus, each successive level of detail has one fourth as many total texels as the previous level. Since the mapping between the polygon and the map does not change, the texels are, in effect, larger in each successive level. During rendering, the appropriate texture level of detail is selected (usually by interpolation) based on the relationship of texel size to pixel size. Thus, MIP mapping works by ensuring that, at the displayed texture level of detail, every texel is at least as big as the pixel that is associated with that texel. Using the MIP mapping approach, no texels are skipped over during the sampling process.

Current systems use the long dimension of the projected pixel footprint to determine the MIP map level of detail to ensure that only a single texture look-up is required for each pixel. Thus, the texels appear one pixel high along the length of the footprint. However, since the texels are square, they will appear to be many pixels wide across the width of the footprint. In this situation, the texture fully modulates the pixels along the length of the footprint and hardly modulates the pixels at all across the width of the footprint. This leads to a peculiar visual effect where textural details seem to attenuate very rapidly on oblique surfaces.

Several polygon mapping techniques are discussed in the above-referenced textbook *Computer Graphics: Principles and Practice*, at section 17.4.3. A number of these techniques involve precomputing lower texture levels of detail with non-square filter kernels. In effect, these solutions average rectangles of texels rather than squares of texels to create new levels of detail. The most aggressive of these approaches is the "sum-table" texture method where the average of any arbitrary rectangle of texels is determined from several look-ups. All of these approaches are lacking because the projected pixel footprint on oblique polygons is not only stretched, but can fall across the texture space at any orientation. Thus, the footprint does not conveniently align with the texture axis. Consequently, using rectangles of averaged texels does not provide a desirable solution.

An elliptical weighted average scheme provides good results, but is not architecturally tractable in a system that must solve pixels at high continuous rates since this scheme requires a large indeterminate number of texture look-ups within each pixel. Consequently, a need exists for an improved computer graphics system that can display oblique texture mapped polygons with minimal aliasing and minimal loss of detail but without exceedingly high processing loads.

The present invention uses a combination of MIP mapping and supersampling to reduce aliasing of texture on an oblique polygon. This technique is based on recognizing that the desired texture level of detail is the level where the size of the texels is equal to the width of the projected pixel footprint not the length of the footprint. By using this level of detail, good modulation across the width of the footprint is obtained.

To reduce aliasing along the length of the pixel footprint, the texture defined within the footprint is supersampled (i.e., multiple texture samples are taken). Specifically, texture samples are taken from the MIP map at locations corresponding to sample points within the footprint along the length of the footprint. These samples are blended to create a single texture value which is blended with the other pixel information to form the final pixel value.

The present invention provides a simple, real-time method of effectively controlling the extra processing load that is required to supersample the texture data. Since the determination of whether to supersample is made on a pixel-by-pixel basis, only those portions of the scene needing supersampling cost extra processing. Thus, only oblique textured polygons will be supersampled and relatively little extra processing will be used when non-oblique polygons are rendered. The process will determine how many samples are to be taken based on a number of factors including the aspect ratio of the projected pixel footprint. In addition, the number of supersamples can be limited to a predefined maximum, thereby reducing the number of samples taken from high aspect ratio footprints.

In a preferred embodiment, a MIP map level of detail is chosen so that the width of the texels from the MIP map approximate the width of the projected pixel footprint. If the length of the footprint is greater than the width, multiple sample points are defined along the length of the footprint. These sample points are defined at spaced intervals along a straight line in the center of the pixel footprint. The sample points defined within the projected pixel footprint are then mapped to the appropriate level of detail in the MIP map whereupon the locations in the MIP map that correspond to the sample points are read. These samples are blended together giving equal weight to each sample, i.e., the sampled values are simply averaged, to form the texture information for the pixel.

The present invention thus utilizes the efficiency of the MIP mapping technique while providing greater texture detail when displaying polygons defined at oblique angles. In addition, relatively simple real time controls are provided that control the amount of extra processing needed to supersample the texture data.

BRIEF DESCRIPTION OF THE DRAWINGS

In the drawings which constitute a part of this specification, an exemplary embodiment exhibiting various objectives and features hereof is set forth, specifically:

FIG. 6 is a flow diagram illustrating an operating process for the system of FIG. 5.

DESCRIPTION OF THE PREFERRED EMBODIMENT

As required, a detailed illustrative embodiment of the present invention is disclosed herein. However, computer graphics systems, component operating structures, graphics processing, multiple level of detailed maps, mapped data, image data, mapping techniques, sampling techniques and blending techniques as well as other elements utilized in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
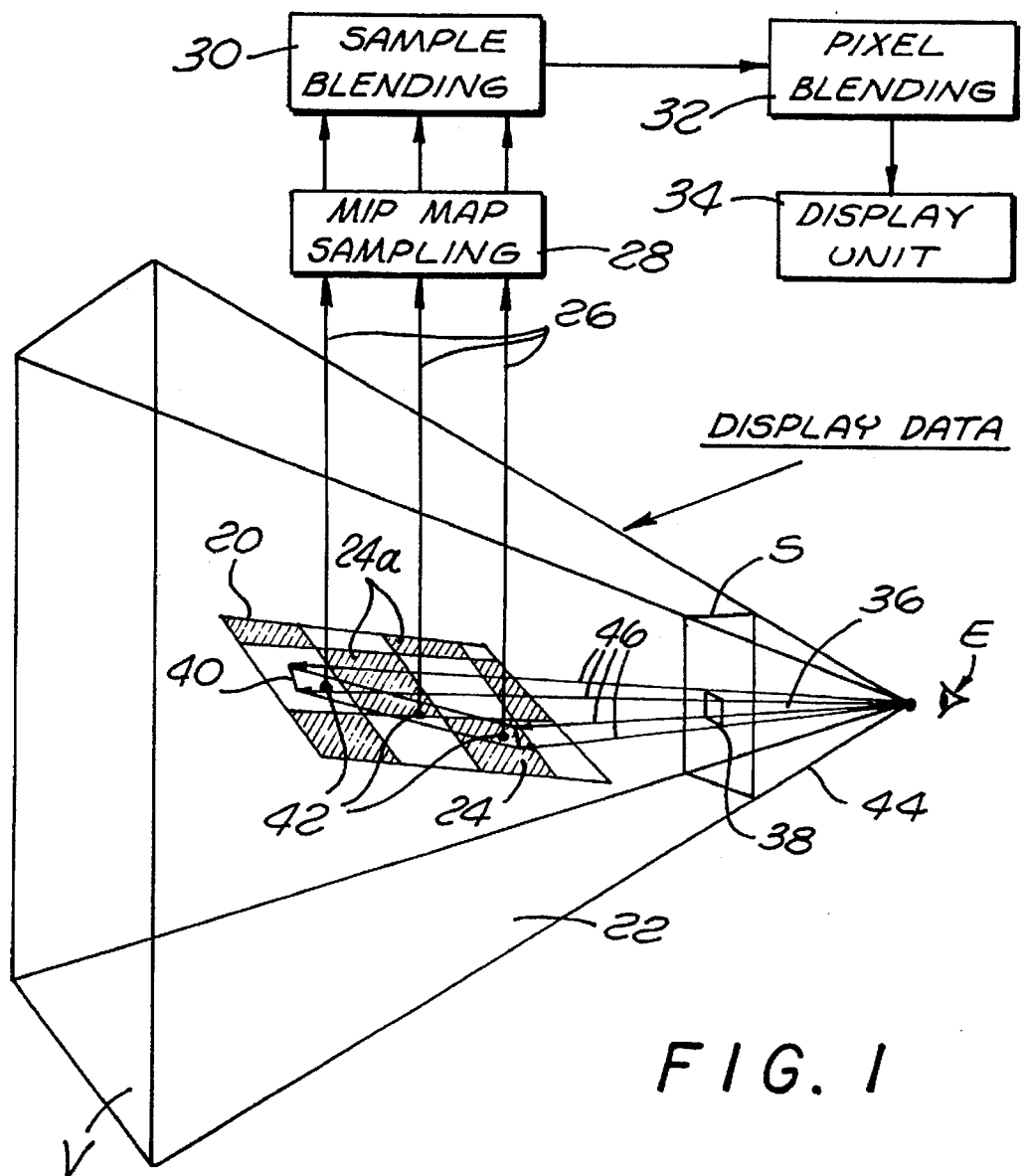
FIG. 1 is a block and pictorial diagram illustrating the concepts of a system constructed in accordance with the present invention including a view frustum radiating from an eye-point to screen space and model space as treated herein.

Referring initially to FIG. 1, a textured polygon 20 is defined in a three-dimensional model space 22. As disclosed in detail below, display data defined within the model space 22 includes a "checkerboard" texture 24 defined on the polygon 20 and mapped (as represented by lines 26) to a texture MIP map (not shown). Data in the MIP map is sampled in a sampling block 28 and blended in a blending block 30. The blended MIP map data is blended with other pixel characteristic data in a blending unit, block 32, and displayed by a display unit 34.

To preliminarily consider the function of the disclosed embodiment, consider the textured polygon 20 defined in the model space 22 at an oblique orientation with respect to an eye-point E. A pixel frustum 36 is created by the view from the eye-point E through a pixel 38. The intersection of the pixel frustum 36 with the polygon 20 forms a projected pixel footprint 40 on the polygon 20. The footprint 40 is elongated because of the oblique orientation of the polygon 20.

In accordance with the present invention, aliasing of the polygon texture 24 is reduced by selecting a texture MIP map level of detail (not shown) that will prevent aliasing across the width of the footprint 40. A locus of points (sample points 42) is defined within the footprint 40. As represented by the lines 26, the sample points 42 are mapped to corresponding supersample locations in the MIP map. In operation, the MIP map texture data is sampled in the sampling block 28 and blended together in the blending block 30 to create a single texture value for the selected pixel 38. This texture data and the other characteristic data for the pixel 38 are blended in the blending block 32 using traditional techniques. The resulting composite pixel data is then sent to the display unit 34 for display. The above process is repeated for each pixel 38 in the screen S having a frustum 36 that intersects a polygon 20 in the model space 22.

Considering the supersampling aspects of the operation in more detail, the three-dimensional model space 22 (FIG. 1) is defined by a frustum of vision 44 defined by the view from an eye-point E through a display screen S to a viewing background V. Visual objects such as the polygon 20 that are defined within the model space 22 are mapped to the two-dimensional display screen S for viewing by a viewer (not shown) at the eye-point E.

The display screen S contains a number of pixels 38, each of which has an associated pixel frustum 36 defined by the four rays 46 from the eye-point E through the corners of the pixel 38. The intersection of the pixel frustum 36 with the polygon 20 forms the projected pixel footprint 40 on the polygon 20. The aspect ratio of the footprint 40 on the polygon 20 depends on the orientation of the polygon 20 with respect to the eye-point E. As FIG. 1 shows, when the polygon 20 is defined at an oblique angle with respect to the eye-point E, the footprint 40 is elongated in at least one dimension.

The polygon 20 is defined with a "checkerboard" texture 24 represented by shaded portions on the polygon 20. The texture 24 is defined in a texture map (not shown but stored in the sampling block 28) and mapped to the polygon 20 with a predefined texture orientation on the polygon 20. For the purposes of illustration, the size of the texels in the texture map are defined equal to the size of the shaded squares 24a depicted on the polygon 20 in FIGS. 1, 2 and 3.

Figure 2:
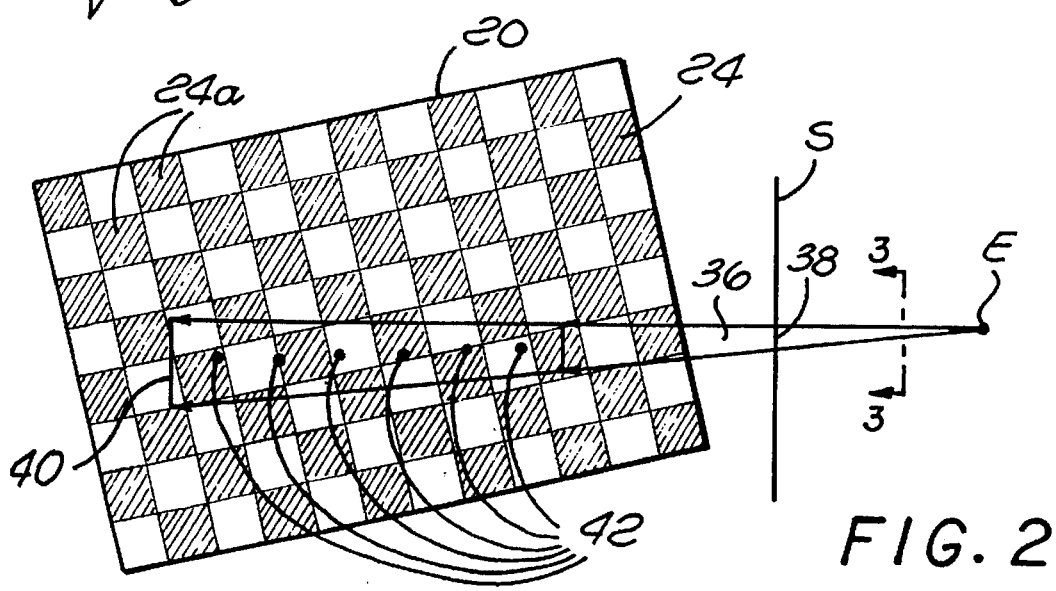
FIG. 2 is a partial plan view of the screen space and model space of FIG. 1.

Referring now to FIG. 2, a partial plan view of FIG. 1 is shown. As in FIG. 1, the view from an eye-point E through a pixel 38 on a display screen S creates a pixel frustum 36 which intersects the textured polygon 20 creating a projected pixel footprint 40 on the polygon 20. Similarly, a texture 24 is shown mapped onto the polygon 20 in FIG. 2.

Figure 3:
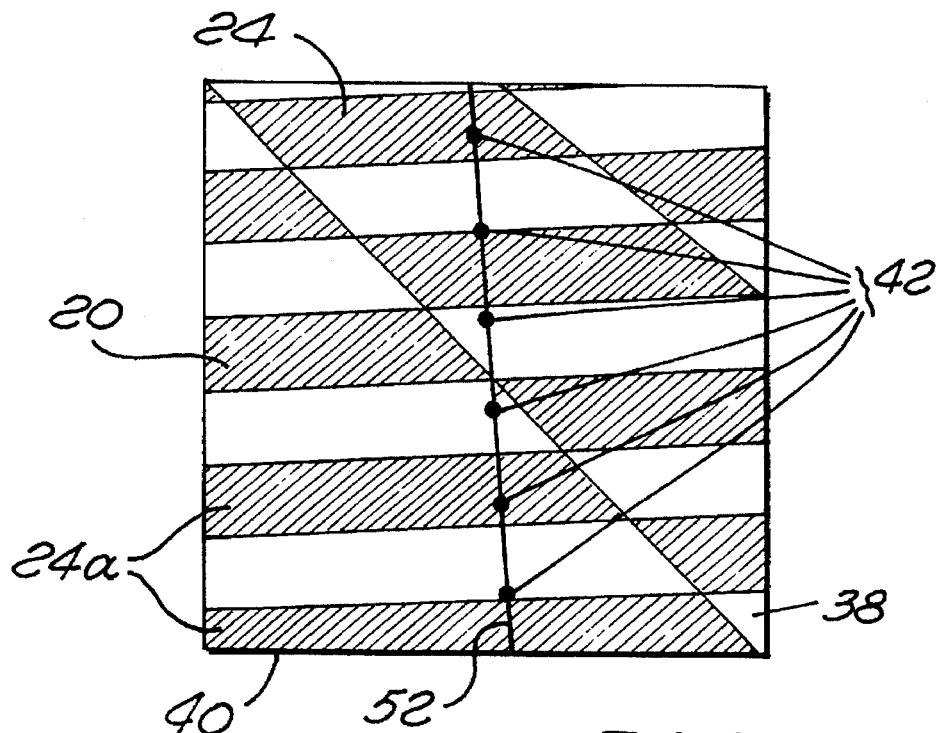
FIG. 3 is a partial sectional view of the screen space taken along line 3—3 of FIG. 2.

Referring now to FIG. 3, the view from the eye-point E along the line 3—3 (FIG. 2) through the pixel 38 is shown. FIG. 3 shows the visual effect as seen from the eye-point E that the oblique orientation of the polygon 20 has on the displayed texture 24. At the bottom of the pixel footprint 40, the width of shaded square 24a is approximately equal to the width of the pixel 38. However, the width of square 24a in the vertical dimension of the pixel 38 is approximately equal to one eighth of the pixel height. Consequently, in accordance with the present invention, the texture map data for this pixel might well be supersampled.

In order to supersample the texture map data defined for a given pixel, as defined in the sampling block 28, three elements must be determined. First, the appropriate level of detail in the texture MIP map must be selected. Second, the number of supersamples to be taken must be determined. Finally, the specific data locations within the MIP map that are to be sampled must be determined. These elements, in turn, are dependent on the aspect ratio of the projected pixel footprint and the texture detail in the texture MIP map.

As indicated above, the aspect ratio of the projected pixel footprint 40 (FIG. 1) is dependent on the orientation of the polygon 20 with respect to the eye-point E. Specifically, the footprint aspect ratio is the reciprocal of the vector dot product of the surface normal of the polygon 20 and a ray extending from the eye-point E to the footprint 40. The vector dot product of two rays (vectors) is the magnitude of the two vectors times the cosine of the angle between them. In this case, the two vectors both have a length of one. Therefore, the dot product is simply the cosine of the angle between the two vectors. Using a geometric equivalency, the angle between the two rays can also be defined in terms of the angle of incidence between the eye-point E and the polygon 20. Accordingly, this angle is equal to 90 degrees minus the angle of incidence which equates to the sine of the angle of incidence. Thus, the aspect ratio of the footprint 40 on the polygon 20 is equal to the reciprocal of the sine of the angle of incidence of the polygon 20 with respect to the eye-point E. The aspect ratio can vary from a value of "1" when the surface is viewed straight on to a value of infinity when the surface is viewed edge on.

Next, in the sampling block 28, the dimensions of the footprint 40 are defined in terms of the size of the texels impacting on the polygon 20. As discussed above, the preferred MIP map level of detail will have a texel size equal to the width of the footprint 40. Therefore, the relationship between the size of the footprint and the size of the texels on the most detailed level (which is equal to the texel size on the polygon 20) must be defined.

The projected pixel size (PPS) is defined as the length of the footprint 40 in texels. The size of the texels can be calculated based on the mathematical relationships between the predefined pattern in the texture map, the predefined size of the polygon 20 and the mapping between the two. PPS is then calculated from the predefined size and location of the pixel 38 and the orientation and position of the polygon 20 in model space 22. The width of the footprint 40 then is calculated by dividing PPS by the aspect ratio calculated earlier.

Having defined PPS in terms of pixel size, PPS is used to select the appropriate MIP map level of detail that will be sampled. As defined, the value of PPS is equal to the ratio of the MIP map level of detail that has texel size equal to the length of the projected pixel footprint 40 and the highest level of detail in the MIP map. Consequently, assuming PPS is greater than "1," it represents the lowest level of detail in the MIP map that should be sampled for this footprint 40. If PPS is less than "1," the texels at the highest level of detail are bigger than either dimension of the pixel footprint 40 and no supersampling will be necessary. However, if PPS is greater than "1," the MIP map has levels of detail that have texels smaller than the length of the projected pixel footprint. In that case, since the desired level of detail texel size is equal to the width of the footprint 40, PPS (which represents the ratio between the MIP map level of detail that will be sampled and the highest MIP map level of detail) should be reduced as close as possible to a ratio that will provide MIP map level of details that have texels the size of the projected pixel footprint width.

There are two primary limits. The first limit is the highest level of detail in the MIP map. Thus, PPS cannot be reduced by more than 1/PPS (i.e. PPS cannot be less than "1"). The second limit is the width of the footprint 40. In order to prevent aliasing in the width direction, a level of detail with texel sizes smaller than the width of the footprint 40 should not be used. Thus, PPS is reduced by the greater of the two limits: 1/PPS or 1/(aspect ratio), with the added limitation that the reduced PPS value be greater than or equal to "1." The resulting PPS value represents the desired level of detail to be sampled.

PPS does not have to be an integer because the super-sampling process interpolates between the levels of detail in the MIP map. For example, as PPS goes from "1" to "2," the process interpolates or blends from the highest MIP map level of detail to the next level. The next transition occurs as PPS goes from "2" to "4," the next as PPS goes from "4" to "8," etc. Note that each MIP map level transition doubles the texel size. Therefore, this mechanism properly orchestrates texel and projected pixel size to control aliasing. Consequently, even though the MIP map levels of detail are discrete powers of two, the blending between levels prevents visual popping of texture detail. In other words, texture levels of detail should be thought of as continuous levels rather than discrete levels.

In an alternative embodiment, an additional limit is used to prevent attempted supersampling of global texture where the process would normally ask for texture that is not available, i.e., beyond the global texture MIP map patch boundary. In this case, if the inverse of the aspect ratio is multiplied by a number that represents the size (in pixels) of the global texels at the patch boundary, the process is prevented from supersampling beyond the global texture patch boundaries. For example, for a normal out-the-window field of view with a 1,024 by 1,024 display, and a global texture patch size of 1,024 texels, the texels will be about 2.2 pixels across at the patch boundary. Thus, setting the limit to 2.2 times the inverse of the aspect ratio will prevent the process from extending supersamples where there is no higher level of detailed texture. In general, this value should be greater than "1" to prevent supersampling of pixel footprints that are only slightly non-square (which is almost everywhere on the image plane). This would significantly reduce the supersampling load without noticeably affecting texture sharpness.

In another embodiment, the reduction of PPS is limited by a predefined maximum number of supersamples. Here, the smallest allowable value by which PPS can be multiplied is restricted by the maximum number of supersamples allowed. For example, if the system is limited to taking eight supersamples, PPS should not be multiplied by anything less than ⅛. In practice, as more supersamples are taken within a pixel, a little more aliasing can be allowed (it is averaged out) so the minimum can be a little smaller than 1/(number of samples).

Once the appropriate level of detail has been selected and PPS reduced, the number of supersamples to be taken from the selected level of detail is calculated. In the preferred embodiment, this number is calculated by simply rounding off PPS to the nearest integer. Thus, the number of samples will directly correspond to the increase in texture detail from the level of detail that corresponds to the projected pixel length to the selected level of detail. Moreover, tests have shown that even though the PPS modifier is a continuous value and the number of supersamples must change in integer steps, there is no apparent texture "popping" when the number of supersamples changes.

Figure 4:
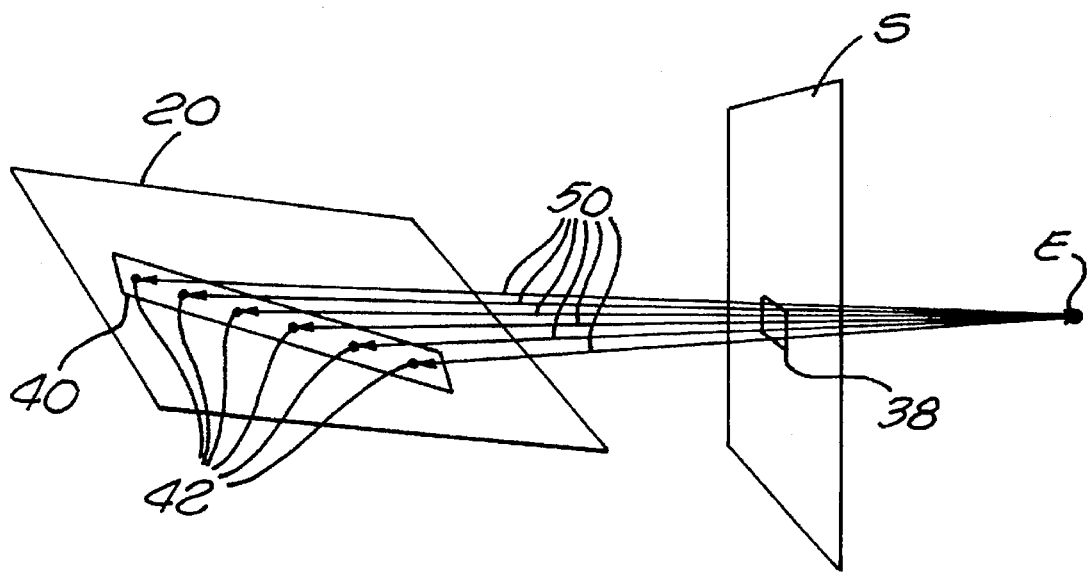
FIG. 4 is a side view of sample rays defined in the screen space and model space as treated herein.

Next, the locations in the MIP map that will be sampled need to be determined. In the preferred embodiment, these locations are determined by defining texture sample points 42 (FIGS. 1, 2 and 3) within the pixel footprint 40 and then mapping these sample points 42 to data locations in the appropriate MIP map level of detail. Referring to FIG. 4, several sample points 42 within the pixel footprint 40 are selected by defining sample rays 50 from the eye-point E to locations within the pixel 38 and extending the rays 50 out to the textured polygon 20 to determine which texels are hit.

In the preferred embodiment, the sample points 42 will be in a straight line through the middle of the pixel footprint (FIG. 2). Consequently, the sample points 42 will also be in a straight line 52 across the face of the pixel 38 (FIG. 3). The screen space orientation of this line of sample points is found by computing the screen space projection of the surface normal of the polygon 20. For tan theta (i.e. flat screen) projections, this orientation is constant across the entire display screen S (FIG. 1) for a single surface. For non-linear image mappings, this orientation will change across the display screen S.

The location of the sampling line within the pixel 38 is determined by transforming the polygon surface normal into screen coordinates, then using the horizontal and vertical (typically X and Y) components of the vector. The orientation of this line can be approximate, therefore, a few bits of the X and Y components are used to determine the orientation. These bits are used with the number of samples desired to access a small table of steering offsets that control where each supersample ray 50 is positioned. As FIGS. 2, 3 and 4 show, in the preferred embodiment, the sample points 42 are evenly spaced within the projected pixel footprint 40.

Once the sample points 42 within the projected pixel footprint 40 are defined, the sample points 42 are mapped to the appropriate supersample locations in the texture MIP map and these locations are sampled. In the preferred embodiment, each of the samples from the MIP map are given equal weight. In other words, the data values retrieved from the texture MIP map are simply added together and divided by the number of samples. This results in a single texture value for the pixel 38. This texture value is then blended with the other pixel characteristic data using standard techniques.

Figure 5:
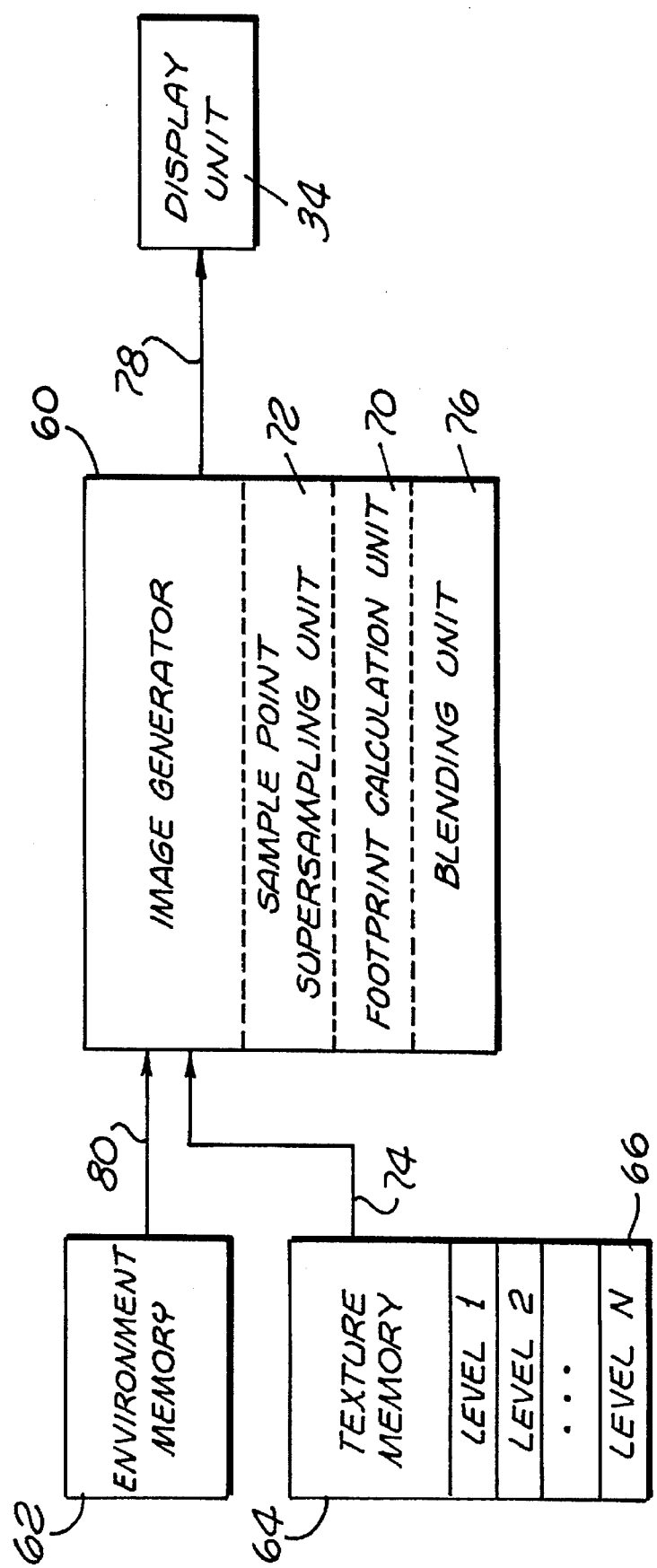
FIG. 5 is a block diagram of a system constructed in accordance with the present invention.

In view of the above explanations of operating steps within the system process, reference will now be made to FIG. 5 showing an operating embodiment implementing the development. An image generator 60 (FIG. 5, center) creates picture elements for display by rendering image data (representative of polygons and surfaces) stored in an environment memory 62 and texture data stored in texture memory 64.

Polygon rendering techniques are well known and widely employed in the art. Related processes are described in U.S. Pat. No. 3,816,726 (Computer Graphics Clipping System For Polygons, Sutherland et al.) and U.S. Pat. No. 3,889,107 (System Of Polygon Sorting By Dissection, Sutherland). Detailed operations and structures of polygon manipulation and display are disclosed in the book *Principles of Interactive Computer Graphics,* 2nd Edition, Newman and Sproull, McGraw-Hill Book Company, 1979, at chapter 16.

The pixel data generated by the image generator 60 is sent to a display unit 34 that contains a frame buffer and a display device. Various formats for organizing and scanning frame buffers to drive displays pixel-by-pixel are disclosed in the above-referenced textbook *Computer Graphics: Principles and Practice,* at chapters 4 and 18.

Considering the operation of the system of FIG. 5 in somewhat greater detail, graphic objects that are to be displayed by the display unit 34 are defined by polygons 20 (FIG. 1) that are stored in the environment memory 62. These polygon definitions are retrieved for processing by the image generator 60 over the line 80. The line 80, as well as lines 74 and 78 (discussed later), generally represent the flow of data from one operation to another. Thus, the lines 74, 78 and 80 may be implemented using any number of data flow techniques including, but not limited to, data busses that connect the data ports of discrete components or busses that are located inside integrated components.

Texture data for those polygons that are textured is stored in texture memory 64. The texture data is defined in a MIP map storage arrangement (memory 64) which includes a number of levels of detail 66. Each successive level 66 in the texture memory 64 contains texels of twice the size of the preceding level. Thus, the amount of detail in each successive level is one fourth that of the detail in the previous level.

The environment memory 62 and the texture memory 64 can be constructed using any of a number of conventional data memory storing techniques including, but not limited to, random access memory (RAM). The environment memory 62 and texture memory 64 may be implemented using separate memory components or the same memory component or may be incorporated into the image generator 60.

The image generator 60 would typically consist of a central processor unit and graphics processor such as those disclosed in the book *Fundamentals of Interactive Computer Graphics*, Foley and Van Dam, 1984, Addison-Wesley Publishing Company, at chapters 4 and 18. In addition to standard polygon rendering capabilities, the image generator 60 has additional components needed for the supersampling operation. The footprint calculation unit 70 performs the operations set forth in FIG. 6 which includes calculating the projected pixel size (PPS) discussed earlier. The footprint calculation unit 70 also calculates the aspect ratio of the projected pixel footprint 40 (FIG. 1) for each pixel 38 and each polygon 20 using the definitions of the polygons 20 in the model space 22. The sample point supersampling unit 72 performs the operations set forth in FIG. 6 which includes sampling the texture memory 64 (also represented by the sampling block 28 in FIG. 1) and retrieving this data through the line 74. The blending unit 76 (also represented by the blending block 30 in FIG. 1) blends the sampled texture data to form the single texture data value that is blended (as represented by the blending block 32 in FIG. 1) with other pixel characteristic data generated by the image generator 60. The resultant pixel data is sent to the display unit 34 over the line 78. This data is then stored in a frame buffer (not shown) and then displayed by display device (not shown).

The basic operation of the polygon rendering process adapted for supersampling of the system in FIG. 5 is treated in FIG. 6 starting at a block 90 (upper left). At a block 92, the image generator 60 (FIG. 5) selects a polygon 20 (FIG. 1) to be rendered. A pixel 38 (FIG. 1) whose pixel frustum 36 intersects the polygon 20 selected at block 92 is selected by the image generator 60 (FIG. 5) at a block 94.

At a block 96, the footprint calculation unit 70 (FIG. 5) calculates the aspect ratio of the projected pixel footprint 40 (FIG. 1) of the pixel selected at block 94 on the polygon selected at block 92. As discussed earlier, this calculation is based on the angle of incidence of the polygon 20 (FIG. 1) with respect to the eye-point E.

The footprint calculation unit 70 (FIG. 5) calculates the projected pixel size of the pixel selected at block 94 on the polygon selected at block 92 using the orientation of the polygon in model space 22 (FIG. 1) and the texel size of the texture 24 on the polygon 20 (block 98).

Then, if PPS is less than "1," the footprint calculation unit sets PPS to "1," indicating that the highest level of detail in the MIP map will be used. On the other hand, if PPS is greater than "1," the footprint calculation unit selects the greater of 1/PPS or 1/(aspect ratio) as the PPS reduction limit (block 100).

At a query block 102, the footprint calculation unit 70 (FIG. 5) determines whether a global MIP map is being used. If a global MIP map is being used, the texel size (in pixels) at the global texture patch boundary is calculated at a block 104. At a block 106, this value is multiplied by 1/(aspect ratio) and PPS is limited by the resultant value. The process then proceeds to a block 108 where the process would have proceeded from block 102 if a global MIP map was not being used.

At the block 108, the sample point supersampling unit 72 (FIG. 5) selects the appropriate MIP map level of detail based on the reduced PPS value. Next, the sample point supersampling unit 72 determines the number of samples to be taken by rounding the reduced PPS value to the nearest integer (block 110). At a block 112, the sample point supersampling unit 72 defines the sample points 42 (FIG. 1) within the projected pixel footprint 40 along a line in the center of the footprint spaced at equal distances along the line. The sample points 42 are then mapped to supersample locations in the MIP map (located in texture memory 64 (FIG. 5)) at the level of detail selected at block 108. At a block 114, the locations in the texture memory 64 (FIG. 5) determined at block 112 are sampled over the line 74 by the sample point supersampling unit 72.

At a block 116, the blending unit 76 (FIG. 5) blends the data sampled at block 114 to form a single texture value for the pixel. The image generator 60 blends this texture value with the other characteristic information for the pixel to form the final pixel data value. This pixel value is then sent to the display unit 34 (FIG. 5) where it is buffered in a frame buffer (not shown) and displayed on a display device (not shown).

At a block 118, the image generator 60 determines if anymore pixel frustums 36 (FIG. 1) from the pixels 38 on the display screen S intersect with the polygon 20 selected at block 92. If more pixels are to be processed, the process proceeds back to the block 94 where the above process repeats.

If no more pixels for this polygon are to be processed, the image generator proceeds to a block 120 and determines if anymore polygons are to be rendered. If more polygons are to be rendered, the process proceeds to the block 92 where the above process is repeated. If no more polygons are to be rendered, the process terminates at a block 122.

From the above, it is apparent that the system disclosed herein utilizing supersampling of multiple level texture data during the polygon rendering process offers an improved system for displaying textured surfaces that are defined at oblique angles in model space with respect to the viewer. Recognizing that the system can be implemented with standard three-dimensional graphics components, it should be noted that considerable variation may occur in the specific components and operating format. The scope of the present invention should be determined with a reference to the claims set forth below.

What is claimed is:

1. A computer graphics system, comprising:
    at least one data memory for storing data elements organized in a plurality of two-dimensional levels of detail and for storing image data defining at least one object in a three-dimensional model space;

an image generator for selecting a selected level of said levels of detail according to a width of a projected pixel footprint and for sampling, at said selected level of said levels of detail, data elements mapped to a locus of sample points defined along a substantially longitudinal path within a projected pixel footprint on said at least one object, said image generator for processing said data elements and said image data in combination to provide picture element data for display; and a display unit including a plurality of pixels, said display unit for displaying said picture element data.

2. The computer graphics system of claim 1 wherein said image generator includes means for determining at least one dimension of said footprint.

3. The computer graphics system of claim 1 wherein said image generator includes means for selecting at least one sample point.

4. The computer graphics system of claim 3 wherein said selecting said at least one sample point includes selecting a sample path.

5. The computer graphics system of claim 4 wherein said sample path defines a substantially longitudinal path within said footprint.

6. The computer graphics system of claim 3 wherein said selecting said at least one sample point includes selecting said selected level.

7. The computer graphics system of claim 6 wherein said selected level is selected based on at least one dimension of said footprint.

8. The computer graphics system of claim 6 wherein said selected level is selected based on a predefined maximum number of samples.

9. The computer graphics system of claim 6 wherein said selected level is selected based on a dimension of said data elements.

10. The computer graphics system of claim 3 wherein said selecting said at least one sample point includes determining a quantity of samples to be taken.

11. The computer graphics system of claim 10 wherein said quantity of samples is determined based on at least one dimension of said footprint.

12. The computer graphics system of claim 10 wherein said quantity of samples is determined based on a predefined maximum number of samples.

13. The computer graphics system of claim 10 wherein said quantity of samples is determined based on a dimension of said data elements.

14. The computer graphics system of claim 1 wherein said data elements are texels.

15. The computer graphics system of claim 1 wherein said plurality of levels of detail is a MIP map.

16. A computer graphics process for sampling data elements organized in a plurality of levels of detail to provide picture element data for display, said process including the steps of:

defining an object in a three-dimensional model space;

defining data elements organized in a plurality of levels of detail;

selecting a selected level of said data elements organized in a plurality of levels of detail according to a width of a projected pixel footprint;

defining a locus of at least one sample point along a substantially longitudinal path within said projected pixel footprint on said object;

providing representations to define a mapping between said at least one sample point and at least one data element defined at said selected level;

sampling said at least one data element; and processing the results of said sampling to provide picture element data for display.

17. A computer graphics process according to claim 16 wherein two or more sample points are defined along a substantially longitudinal path within said footprint.

18. The computer graphics process of claim 16 wherein said selected level is selected based on at least one dimension of said projected pixel footprint.

19. The computer graphics process of claim 16 wherein said selected level is selected based on a predefined maximum number of sample points.

20. The computer graphics process of claim 16 wherein said selected level is selected based on a dimension of said at least one data element.

21. The computer graphics process of claim 16 wherein a width of said at least one data element defined at said selected level is shorter than a length of said projected pixel footprint.

22. A computer graphics process according to claim 16 wherein defining said locus of at least one sample point involves determining a quantity of sample points in said locus.

23. A computer graphics process according to claim 22 wherein said quantity of sample points is based on at least one dimension of said footprint.

24. A computer graphics process according to claim 22 wherein said quantity of sample points is based on a predefined maximum number of sample points.

25. A computer graphics process according to claim 22 wherein said quantity of sample points is based on a dimension of said at least one data element.

26. A computer graphics process according to claim 16 further including the step of selecting a projected pixel footprint of elongated shape for supersample processing.

27. A computer graphics process according to claim 16 further including the step of blending said data elements with image data to provide picture element data for display.

* * * * *